United States Patent

[11] 3,596,670

| [72] | Inventors | Robert O. Fehr<br>Greenwich;<br>Augustus H. Fiske, Jr., West Redding, both of, Conn. |
|---|---|---|
| [21] | Appl. No. | 770,273 |
| [22] | Filed | Oct. 24, 1968 |
| [45] | Patented | Aug. 3, 1971 |
| [73] | Assignee | Fehr & Fiske, Inc.<br>Westport, Conn. |

[54] FLUIDIC CONTROL DEVICE
6 Claims, 5 Drawing Figs.

[52] U.S. Cl. ................................................... 137/81.5
[51] Int. Cl. ...................................................... F15c 1/04
[50] Field of Search............................................ 137/81.5;
340/239; 73/204

[56] References Cited
UNITED STATES PATENTS

| 1,477,645 | 12/1923 | Hall | 137/81.5 UX |
| 2,965,888 | 12/1960 | Johnston et al. | 340/244 |
| 3,059,443 | 10/1962 | Garner | 340/244 X |
| 3,153,934 | 10/1964 | Reilly | 340/239 X |
| 3,203,237 | 8/1965 | Ogren | 137/81.5 X |
| 3,258,685 | 6/1966 | Horton | 137/81.5 X |
| 3,258,760 | 6/1966 | Carlson et al. | 340/239 |
| 3,368,212 | 2/1968 | Klyce | 340/239 |
| 3,425,278 | 2/1969 | Buzza | 73/204 |
| 3,438,384 | 4/1969 | Hurvitz | 137/815 |

Primary Examiner—Samuel Scott
Attorney—Ervin B. Steinberg

ABSTRACT: In a fluidic control circuit having a main fluid inlet conduit, a pair of main fluid outlet conduits for receiving fluid from said inlet conduit, and a set of control conduits for causing responsive to fluid flow in the latter the main fluid to flow either in one or the other outlet conduit, a thermally responsive electrical-sensing means is provided in each of said outlet conduits to be responsive to the presence or absence of fluid flow. The sensing elements are connected in an electrical circuit which provides a condition responsive signal suitable for control purposes.

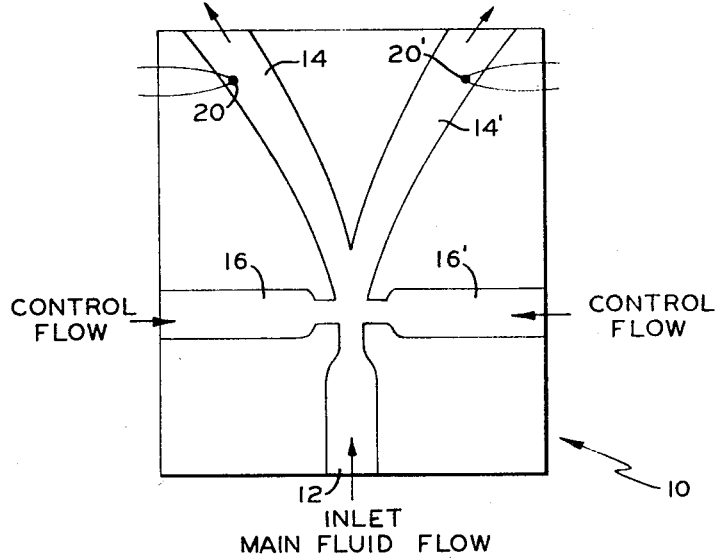
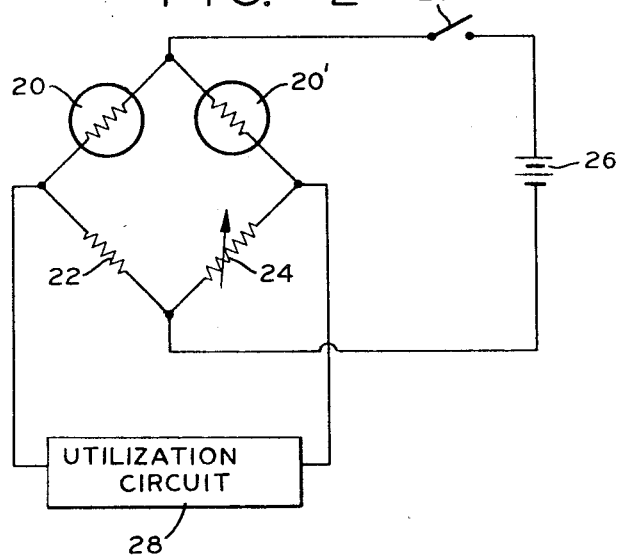

INVENTORS.
ROBERT O. FEHR
AUGUSTUS H. FISKE JR.

FLUIDIC CONTROL DEVICE

This invention refers to fluidic devices and fluidic control circuits and, in particular, concerns translating means associated with such devices or control circuits for providing an output signal responsive to the selective fluid flow in a fluidic device. More specifically, this invention refers to electrical-sensing means disposed in the main fluid outlet conduits of fluidic devices and an electrical circuit for energizing such sensing means whereby to derive, responsive to the presence or absence of fluid flow in the associated conduit, a fluid flow condition responsive signal. A utilization circuit coupled to the electrical circuit is adapted to provide a control signal, an indication, or a signal suitable to initiate other functions responsive to the fluid flow conditions sensed.

Fluidic devices are essentially fluid-operated control devices having a main fluid inlet conduit, two fluid outlet conduits for receiving main fluid flow from said inlet conduit, and a pair of control conduits for providing main fluid flow in either one or the other of the outlet conduits responsive to the selective fluid flow in the control conduits. Since a fluidic circuit and the control devices are sealed, it is difficult to determine from the outside whether fluid flows, at what rate, or in which of the outlet conduits. Present practice employs pressure gauges for flow indication. It will be appreciated by those skilled in the art that such gauges are relatively expensive, slow in response, space consuming, and measure only in an indirect manner the quantity or condition of interest.

A typical arrangement comprehended by this invention employs two thermally responsive electrical-sensing elements, preferably elements known as "thermistors" which are characterized by a significant negative thermal coefficient of electrical resistivity. Each of the two outlet conduits is provided with one such sensing element in such a manner that the respective element is affected by fluid flow in the respective conduit. An electrical circuit energizes the elements and provides also an output signal indicative of the fluid flow condition of the conduits.

One of the principal objects of this invention is, therefore, the provision of a new and improved arrangement for fluidic devices and fluidic control circuits.

Another important object of this invention is the provision of electrical-sensing elements in a fluidic device for sensing the fluid flow condition therein, the elements being characterized by extreme simplicity, fast response, reliability, and small physical dimension.

A still further object of this invention is the provision of a fluidic device provided with thermally responsive electrical-sensing means for indicating the fluid flow condition in the device.

A further and still other object of this invention is the provision of a fluidic device having a main fluid flow inlet conduit, two main fluid flow outlet conduits, and control means for selectively causing fluid flow from said inlet conduit through one or the other outlet conduit, each of said outlet conduits being provided with a thermally responsive electrical-sensing element connected in an electrical circuit for deriving a fluid flow condition responsive signal.

Further and still other objects of this invention will be more clearly apparent from the following description when taken in conjunction with the accompanying drawings in which:

FIG. 1 is a schematic representation of a fluidic device and of the sensing elements provided therein;

FIG. 2 is a schematic electrical circuit diagram of a typical electrical circuit for deriving the fluid condition responsive signal;

Figure 3:
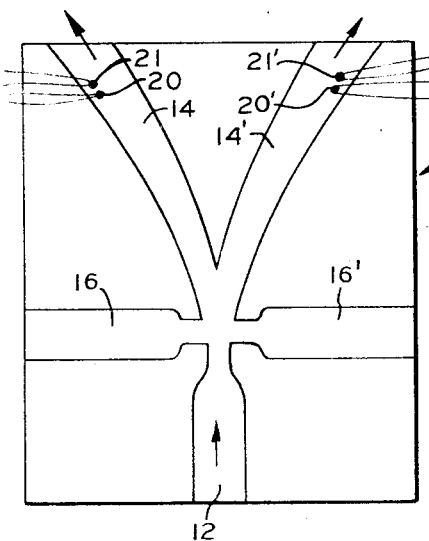
FIG. 3 is a schematic representation of a fluidic device and of an alternative arrangement of the sensing elements.

Referring now to the figures and FIG. 1 in particular, numeral 10 identifies a standard fluidic device, such an an amplifier or a flip-flop. As is well known by those skilled in the art, the device includes a main fluid flow inlet conduit 12, a pair of main fluid flow outlet conduits 14 and 14', and a set of control fluid flow conduits 16 and 16'. The conduits 14 and 14' are provided with fluid flow from the conduit 12 responsive to the selective fluid flow through the control conduits.

In accordance with our invention, a thermally responsive electrical-sensing element is placed in each of the outlet conduits. As is shown, the element 20 is disposed in the conduit 14 and the element 20' is disposed in the conduit 14'. While the thermally responsive elements may be placed in the conduits for direct contact by the fluid, they may be placed alternatively in abutting relation with the wall of the conduit, possibly slightly recessed. The only condition necessary is that the element be affected by fluid flow in the respective conduit.

In the preferred embodiment the sensing element is a "thermistor" which is a device having a negative thermal coefficient of electrical resistivity, that is, the electrical circuit resistance of the element decreases with increasing temperature. Hence, when the element is heated by electrical current flowing therethrough, it assumes a certain temperature and electrical resistance. In the absence of fluid flow, the temperature of the element is high. When fluid flows, the element is cooled thereby and, therefore, exhibits an increased electrical resistance. This change in electrical resistance is clearly discernible by suitable means and provides an indication of the fluid flow conditions prevailing in the fluidic device.

FIG. 2 shows an embodiment of the electrical circuit. The circuit is an electrical bridge wherein the sensing elements 20 and 20' are connected in respective arms, and a fixed resistor 22 and a variable resistor 24 in the other arms. The circuit is adapted to be energized from a source of direct or alternating current 26 via a switch 27. A utilization circuit 28 is coupled across the output terminals of the bridge circuit.

The current supplied from the source 26 is sufficient to heat the thermally responsive elements 20 and 20'. The bridge can be balanced by means of the resistor 24 in such a manner that in the absence of fluid flow in either conduit 14 and 14' no output signal appears across the utilization circuit 28. Responsive to fluid flow in one or the other conduit 14 or 14' a positive or negative signal appears across the utilization circuit, the polarity of the signal being indicative of fluid flow conditions.

For visual observation, the utilization circuit may comprise a simple voltmeter with zero voltage indication in the center. Alternatively, the utilization circuit may comprise a contact-making meter so that, aside from visual observation, control circuits can be actuated. Still further, polarity sensitive relays may be used to cause closing or opening of contacts responsive to the signal derived from the bridge circuit having a predetermined polarity and magnitude. Other utilization devices may include signalling devices, polarity responsive amplifiers, servo drives and the like, all of these devices being well known to those skilled in the art and available in commercial channels.

It should be observed further that the above-described circuit is suitable also for providing an indication when the fluid flow deviates from normal conditions, such as may be caused by a partial blockage of conduits either within the device 10 or outside. In this latter case, the signal across the terminals of the utilization circuit 28 deviates from the normally obtained value owing to the fact that the respective sensing element is not properly cooled and, hence, exhibits a higher resistance. This condition is immediately apparent and appropriate steps can be initiated.

Figure 4:
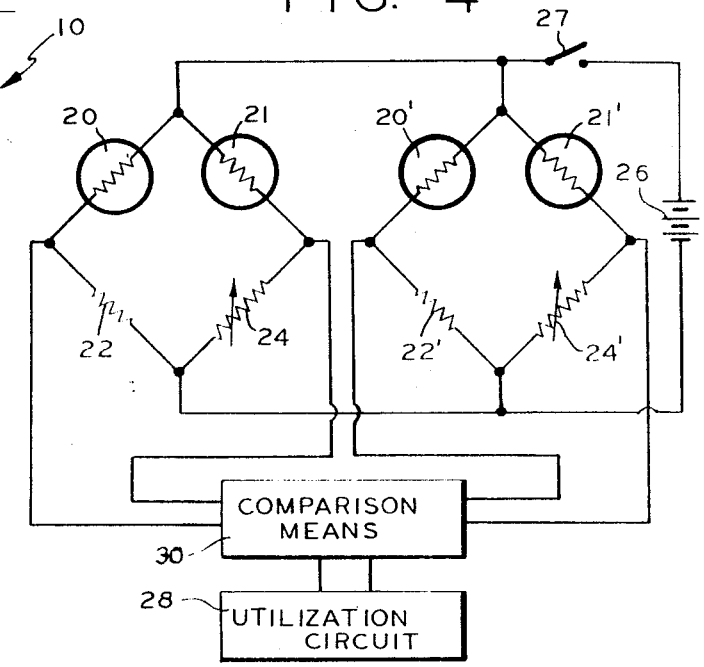
FIG. 4 is a schematic electrical circuit diagram of a typical electrical circuit for use in connection with the embodiment per FIG. 3.

A further embodiment of the invention is shown in FIGS. 3 and 4. This arrangement is characterized by thermal compensation, that is, the output is insensitive to the temperature of the fluid flowing in a respective conduit. As illustrated in FIG. 3, the left conduit is provided with two sensing elements arranged in tandem 20 and 21, and the right conduit 14' is fitted similarly with two elements 20' and 21'. The respective elements associated with a conduit are so disposed that the second element is located slightly downstream with respect to the first, or upstream, element. If fluid flow exists, the first element will be cooled more than the second element, since the fluid stream is slightly heated by contact with the first element and subsequently reaches the second element. In the absence of fluid flow, both elements are at the same temperature. Hence, the existence of fluid flow causes a difference in temperature and electrical resistance between the two elements forming a pair, manifesting itself as a difference signal.

FIG. 4 shows the associated electrical circuit which includes two bridge circuits. The elements 20 and 21 are placed in respective arms of a first bridge circuit, and the elements 20' and 21' are disposed in respective arms of the second bridge circuit. The first bridge circuit includes resistances 22 and 24, and the second bridge circuit the resistances 22' and 24'. Both bridge circuits are coupled in parallel and connected to a source 26 via the switch 27. In the absence of fluid flow in either conduit, the bridge circuits are balanced so that no output signal appears across the respective output terminals. If fluid flow is present, a difference signal as stated above occurs and, hence, a signal across the output terminals of the respective bridge circuit is produced. The output terminals of both bridge circuits are connected to a comparison means 30 which, in turn, may be connected to a utilization circuit 28. Typically, the comparison means may comprise a differential transformer, a servo mechanism, a differential relay etc., suitable for providing a signal indicative of the respective imbalance condition. As will readily be apparent, both bridge circuits are balanced in such a manner that, in the absence of fluid flow in either outlet conduit, no signal is applied to the comparison means. With fluid flow in one of the conduits, the comparison means 30 receives a signal from that resistance bridge circuit whose sensing elements are subjected to the effects of fluid flow.

Figure 5:
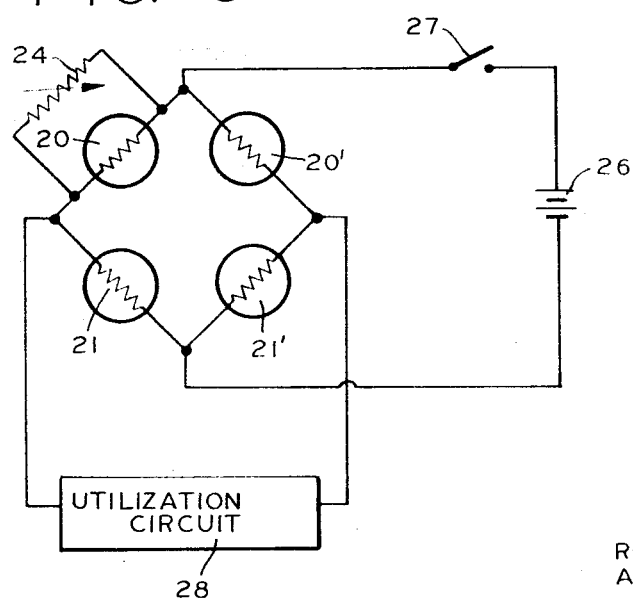
FIG. 5 is a schematic electrical circuit diagram of an alternative electrical circuit usable in connection with the arrangement depicted in FIG. 3.

An alternative bridge circuit arrangement is shown in FIG. 5. A single bridge circuit is used and each of the sensing elements 20, 21, and 20' and 21' is connected in a respective arm of the bridge circuit. An adjustable resistor 24 is coupled in parallel with one of the elements in order to balance the bridge circuit as explained above. If the respective resistance of the elements is not matched sufficiently, additional balancing resistors may need to be added.

In another alternative arrangement, the sensing elements 20 and 20' may be heated to a greater degree than the elements 21 and 21', FIG. 3. This condition can be accomplished by adding resistances in series with the elements 21 and 21', or by selecting the thermistors so that the elements 21 and 21' exhibit a higher circuit resistance than the elements 20 and 20'.

It will be apparent that the provision of thermally responsive electrical-sensing elements in a fluidic circuit or control device as described above provides important advantages and benefits not readily available with the heretofore used arrangements. An electrical signal indicative of the fluid flow conditions is obtained in most simple and reliable manner.

What we claim is:

1. In a fluidic device having a main fluid flow inlet conduit, a pair of main fluid flow outlet conduits for receiving fluid from said inlet conduit, and control means for causing responsive to a control signal the main fluid to flow either in one or the other of said outlet conduits, the improvement comprising:

two pairs of thermally responsive electrical circuit elements, each pair associated with one of said outlet conduits and the elements forming a respective pair being disposed in tandem to cause fluid flow in the respective conduit to affect first one of said elements and subsequently the other one to produce an ambient temperature-independent temperature differential between the elements forming a respective pair;

electrical circuit means coupled for providing current flow through each pair of elements whereby to heat said elements and causing said elements to exhibit an electrical circuit resistance responsive to the fluid flow condition in the respective conduits, and means coupled to said elements for being responsive to the electrical resistance condition exhibited by said respective pairs of elements.

2. In a fluidic device as set forth in claim 1, said electrical circuit means including an electrical resistance bridge circuit and means for supplying electric energy to said bridge circuit, and each of said thermally responsive electrical circuit elements being connected in a respective arm of said bridge circuit.

3. In a fluidic device as set forth in claim 2 and including means for balancing said bridge circuit, and said means coupled to said elements comprising an electrical potential responsive device coupled for being responsive to an imbalanced circuit condition of said bridge circuit.

4. In a fluidic device as set forth in claim 1, said electrical circuit means including a pair of electrical resistance bridge circuits and means for supplying electrical energy to said bridge circuits, and each of the elements forming a pair being connected in a respective arm of a respective bridge circuit.

5. In a fluidic device as set forth in claim 4 and including means connected to each bridge circuit for balancing such bridge circuit, and said means coupled to said elements comprising a comparison means coupled to said bridge circuits for being responsive to the difference in electrical potential across the output terminals between said bridge circuit.

6. A fluidic device comprising:

a main fluid flow inlet conduit;

a pair of main fluid flow outlet conduits disposed for receiving fluid flow from said inlet conduit;

control means disposed for causing responsive to a control signal the main fluid flow from said inlet conduit to flow selectively either in one or the other of said outlet conduits;

a pair of thermistors disposed in tandem in each of said outlet conduits and the respective thermistors forming a pair being disposed relative to each other so that a quantity of fluid flowing in the associated conduit first affects the first and then the second thermistor forming the pair, whereby to cause responsive fluid flow an ambient temperature-independent temperature difference between said thermistors forming a pair;

electrical circuit means coupled for providing current flow through each pair of thermistors to heat said thermistors and to cause said thermistors to exhibit an electrical circuit resistance responsive to the fluid flow condition in a respective conduit, and further electrical circuit means coupled to said thermistors for being responsive to the electrical resistance exhibited by said respective pairs of thermistors, whereby to discern the presence or absence of fluid flow in the respective outlet conduits.